US012424736B2

(12) United States Patent
Finkel et al.

(10) Patent No.: US 12,424,736 B2
(45) Date of Patent: Sep. 23, 2025

(54) PORTABLE RESONANT MULTIFERROIC MAGNETOELECTRIC ANTENNA FOR ULF/VLF COMMUNICATION

(71) Applicant: The Government of the United States of America, as represented by the Secretary of the Navy, Arlington, VA (US)

(72) Inventors: Peter Finkel, Baltimore, MD (US); Margo Staruch, Alexandria, VA (US); Thomas Mion, Ellicott City, MD (US); Alex Moser, Fort Washington, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 139 days.

(21) Appl. No.: 18/386,402

(22) Filed: Nov. 2, 2023

(65) Prior Publication Data

US 2024/0145907 A1 May 2, 2024

Related U.S. Application Data

(60) Provisional application No. 63/421,645, filed on Nov. 2, 2022.

(51) Int. Cl.

*H10N 35/00* (2023.01)
*H01Q 1/36* (2006.01)
*H01Q 5/10* (2015.01)
*H01Q 9/16* (2006.01)
*H10N 39/00* (2023.01)

(52) U.S. Cl.

CPC ................. *H01Q 1/36* (2013.01); *H01Q 9/16* (2013.01)

(58) Field of Classification Search

CPC .......... H01Q 1/243; H01Q 1/36; H01Q 1/364; H01Q 9/06; H01Q 9/16; H01Q 5/10; H10N 35/00; H10N 35/85; H10N 30/00; H10N 39/00

See application file for complete search history.

(56) References Cited

U.S. PATENT DOCUMENTS

2019/0267534 A1* 8/2019 Sun ........................ H10N 35/80
2022/0168579 A1* 6/2022 Robinson ............... H10N 35/00

* cited by examiner

*Primary Examiner* — Thai Pham

(74) *Attorney, Agent, or Firm* — US Naval Research Laboratory; Suresh Kosby

(57) ABSTRACT

The present invention provides a magnetoelectric multiferroic, time-variable magnetic field transmitter based upon a resonant structure capable of enhancing the transmitted field at the structural resonant frequency. This transmitter utilizes a single crystal piezoelectric as the source of mechanical excitations with a laminated transduction element to reduce eddy currents in the magnetostrictive material thereby reducing losses at higher frequencies. The structural resonance frequency can be tuned by adjusting the size of the masses, position and strength of bias magnets, pre-stress conditions and physical parameters of the transduction column elements.

24 Claims, 11 Drawing Sheets

PORTABLE RESONANT MULTIFERROIC MAGNETOELECTRIC ANTENNA FOR ULF/VLF COMMUNICATION

PRIORITY CLAIM

The present application is a non-provisional application claiming the benefit of U.S. Provisional Application No. 63/421,645, filed on Nov. 2, 2022 by Peter Finkel et al., entitled "PORTABLE RESONANT MULTIFERROIC MAGNETOELECTRIC ANTENNA FOR ULF/VLF COMMUNICATION." This application and all other publications and patent documents referred to throughout this nonprovisional application are incorporated herein by reference in their entirety.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case No. 211208-US2.

BACKGROUND OF THE INVENTION

Field of the Invention

The invention relates to magnetoelectric magnetic transmitter devices.

Description of the Prior Art

There is a need for ultra-low frequency (ULF) and very-low frequency (VLF) telecommunication transmission through conductive media (seawater, earth, metallic shielding, etc.) which is prevented at higher frequencies. Transmission frequencies at 3 kHz correspond to a wavelength of 100 km, making a full or quarter wave transmission tower prohibitively large and expensive to build and operate. Utilizing electrically short antennas for this application presents a practical avenue of generating ULF/VLF transmission for use in radio frequency (RF) denied areas.

SUMMARY OF THE INVENTION

The present invention provides a magnetoelectric multiferroic, time-variable magnetic field transmitter based upon a resonant structure capable of enhancing the transmitted field at the structural resonant frequency. In addition, this system utilizes a single crystal piezoelectric as the source of mechanical excitations with a laminated transduction element to reduce eddy currents in the magnetostrictive material thereby reducing losses at higher frequencies. The structural resonance frequency can be tuned by adjusting the size of the masses, position and strength of bias magnets, pre-stress conditions and physical parameters of the transduction column elements.

Described herein is a resonant magnetoelectric transmitter device utilizing a laminated transduction element comprised of 300 μm thick $Fe_{1-x}Ga_x$ (x=0.175) (Galfenol) layers driven with a single crystal piezoelectric ($Pb(In_{1/2}Nb_{1/2})O_3$—$Pb(Mg_{1/2}Nb_{2/3})O_3$—$PbTiO_3$ (PIN-PMN-PT)). When under an initial compressive stress, the magnetoelastic transduction element dynamically changes permeability in response to an applied axial dynamic stress. The changing permeability in the laminated Galfenol rod results in a radiated magnetic dipole which reaches a maximum on the structural resonance frequency.

This invention utilizes the structural resonance of a device with a head and tail mass that are allowed to move freely with the ability to adjust the compressive stress on the transduction element to optimize transmitter conditions.

Some advantages of the present invention include the following:

- The magnetoelastic material is placed in a resonant structure allowing for resonant amplification of the applied stresses thereby increasing the induced magnetic field produced by the actuated laminated Galfenol rod
- The laminated Galfenol rod was constructed with 300 micrometer thick laminates reducing the eddy currents which would otherwise take place in the rod and reduce the transmitted signal at high frequencies (kHz).
- The bias magnets are imbedded in a Tungsten-polymer matrix in order to reduce the size and increase portability as well as use a non-magnetic mass to enhance the transmitted magnetic dipole signal.
- One or more piezoelectric PIN-PMN-PT single crystals are used to drive the Galfenol rod dynamic stresses which reduces the power required due to a lower impedance of the crystal vs PZT and provides a higher dynamic stress due to its larger piezoelectric constant, resulting in a larger transmitted signal with lower power consumption.

These and other features and advantages of the invention, as well as the invention itself, will become better understood by reference to the following detailed description, appended claims, and accompanying drawings.

BRIEF DESCRIPTION OF THE DRAWINGS

FIG. 4A is a vertical image, and FIG. 4B is a horizontal image.

DETAILED DESCRIPTION OF THE INVENTION

Multiferroic based magnetoelectric systems can generate a time variable magnetic field by using a piezoelectric element to induce changes in the internal magnetization of a magnetostrictive transduction element. By changing the magnetization within the ferromagnetic transducer, a magnetic dipole is created and modulated through the stress induced by the piezoelectric element. This effect can be enhanced by housing the antenna within a device that has a known structural resonance profile. Multiple elements must be considered to optimize the system including the magnetostrictive material, piezoelectric material, resonant structure properties, and optimal operating stresses to design a structure with an appropriate resonant condition.

Through design and testing it was determined the optimal magnetostrictive material was $Fe_{1-x}Ga_x$ (x=0.175) (Galfenol), though a rod of Galfenol being utilized in this fashion would form magnetic eddy currents due to the changing magnetic field within a conductor at higher frequencies. To alleviate the effect of eddy currents on the signal transmission, a rod of magnetostrictive Galfenol comprising 300 m layers laminated together with epoxy was fabricated (FIG. 3) to fit into a resonant transducer driven by a piezoelectric single crystal element based on In-doped lead magnesium niobite-lead titanate (PMN-PT). Testing of this resonance device across the fundamental resonance mode reveals it is possible to create a transmitter operating in the kHz range for communication through conductive media. The transmitter utilizes the dynamic change of permeability found in laminated Galfenol strips when a strain is applied and makes use of the tunable structure and mechanical resonance in order to improve efficiency.

Figure 2:
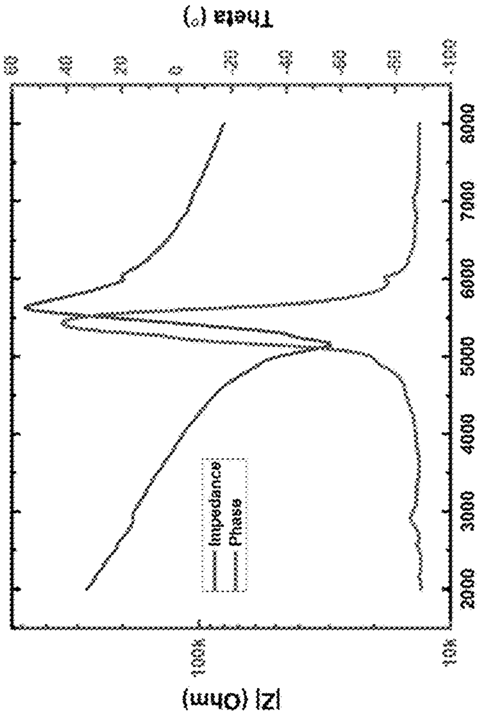
FIG. 2 shows the resonant profile of the magnetoelastic transmitter for the fundamental mode of the resonator shown in FIG. 1.
Figure 1:
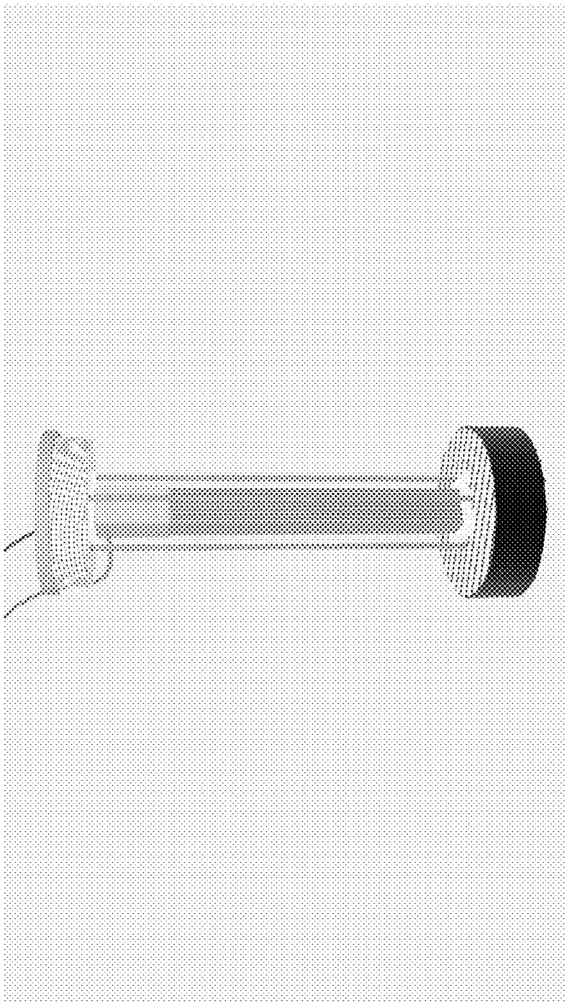
FIG. 1 shows a constructed resonator for magnetoelastic transduction with a tungsten head mass and a stainless steel tail mass.
Figure 3:
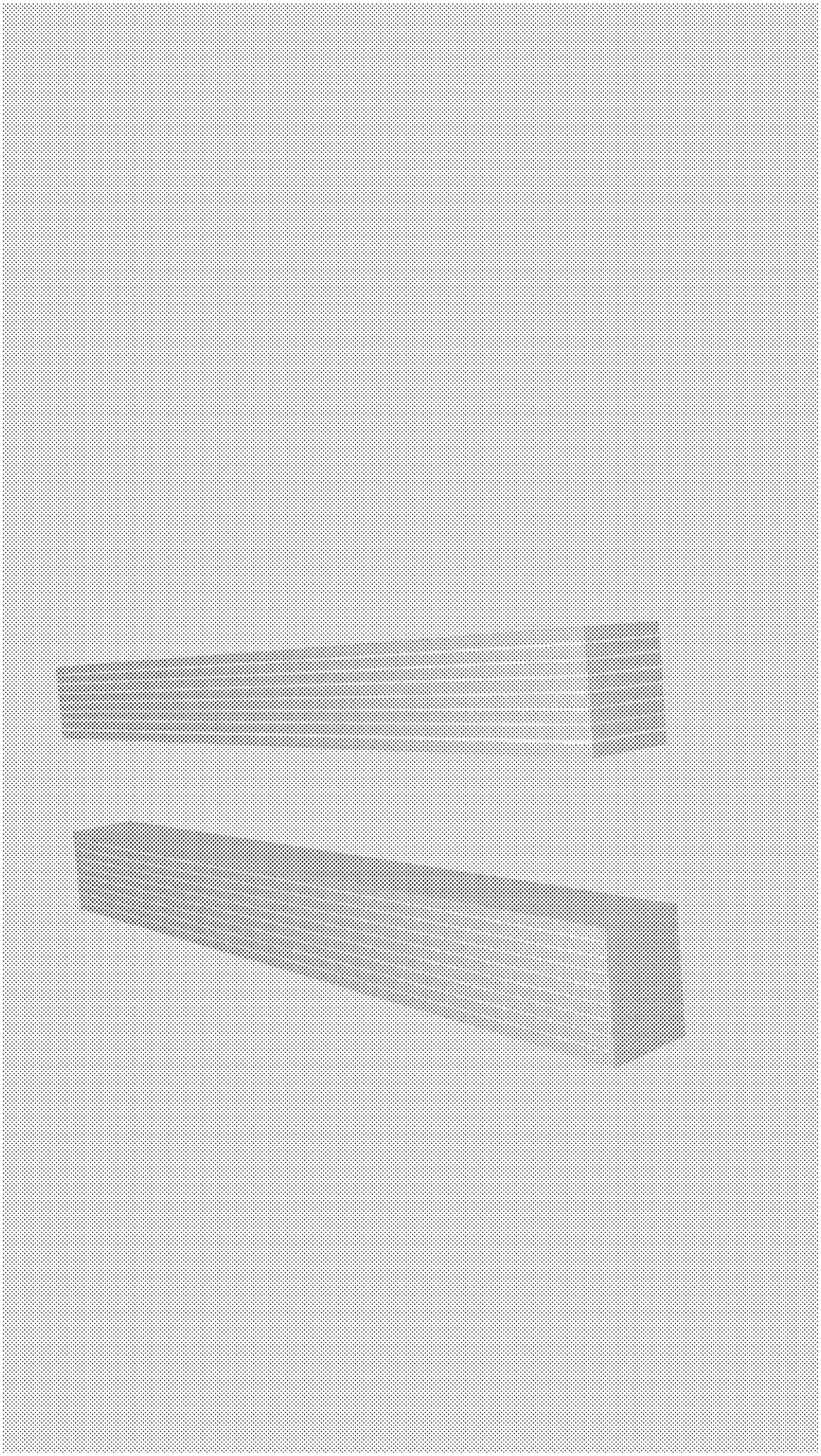
FIG. 3 shows laminated Galfenol rods for the transduction element.

In one embodiment, a resonant device was constructed out of tungsten and stainless-steel head and tail masses in order to have larger masses and reduce the resonance condition of the structure (FIGS. 1 and 2). FIG. 1 shows a constructed resonator for magnetoelastic transduction with a tungsten head mass and a stainless steel tail mass. FIG. 2 shows the resonant profile of the magnetoelastic transmitter for the fundamental mode of the resonator shown in FIG. 1. Additionally, the bias permanent magnets which are needed for creation of the magnetic dipole are affixed externally adding to the size of the transmitter. A laminated Galfenol transduction element was fabricated to reduce eddy currents generated in the active element (FIG. 3).

Figure 4B:
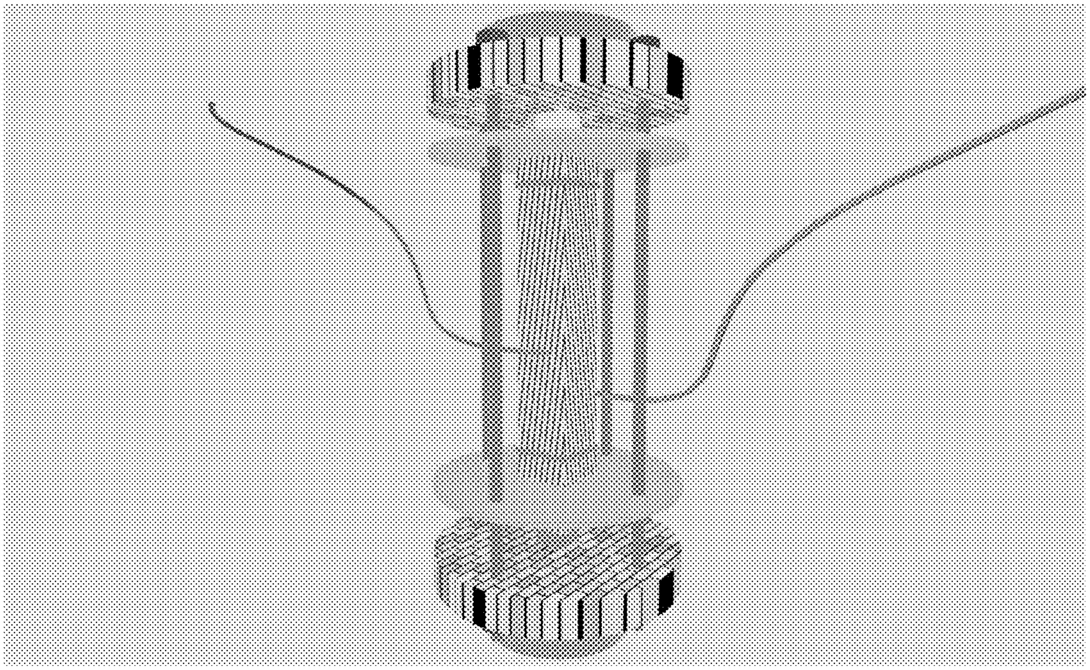
FIGS. 4A and 4B show a constructed resonator with 3D printed head and tail masses with bias magnet slots and spring washers to adjust pre-stress.
Figure 4A:
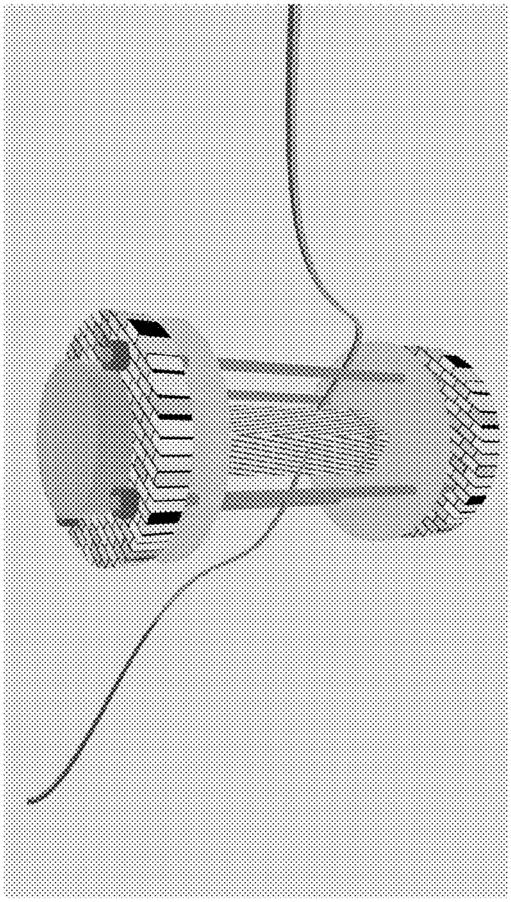
Figure 5:
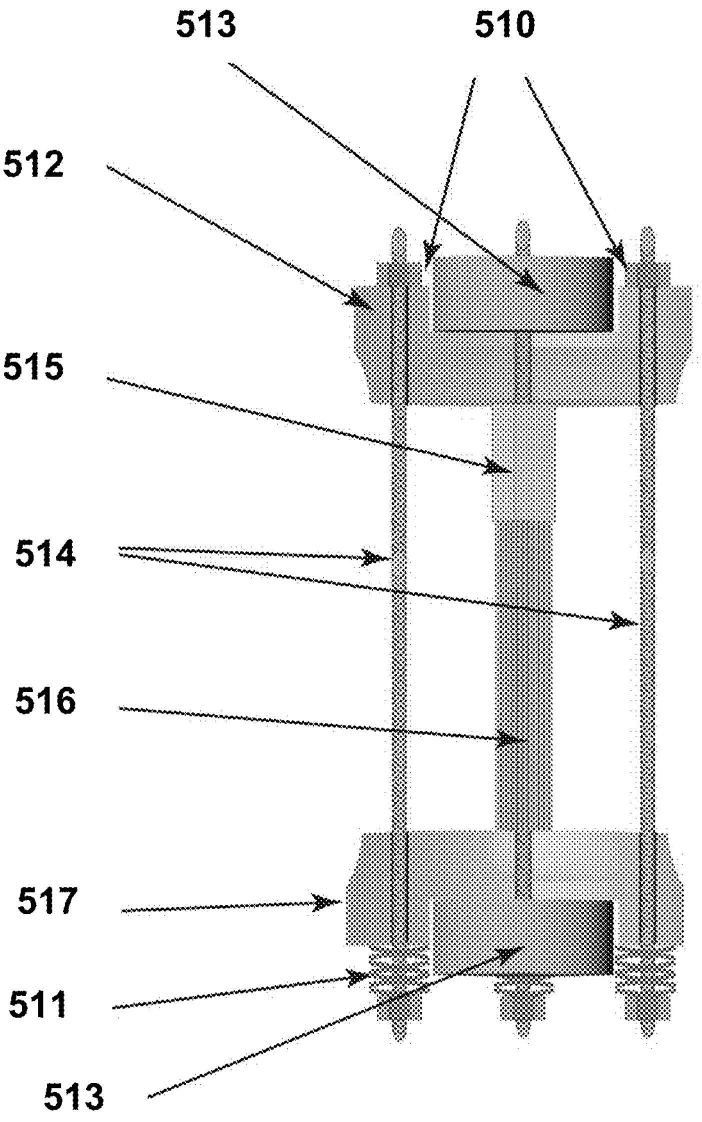
FIG. 5 is a cross sectional view of a magnetoelectric based resonator device with 3D printed head and tail masses with bias magnet slots and spring washers to adjust pre-stress.
Figure 6:
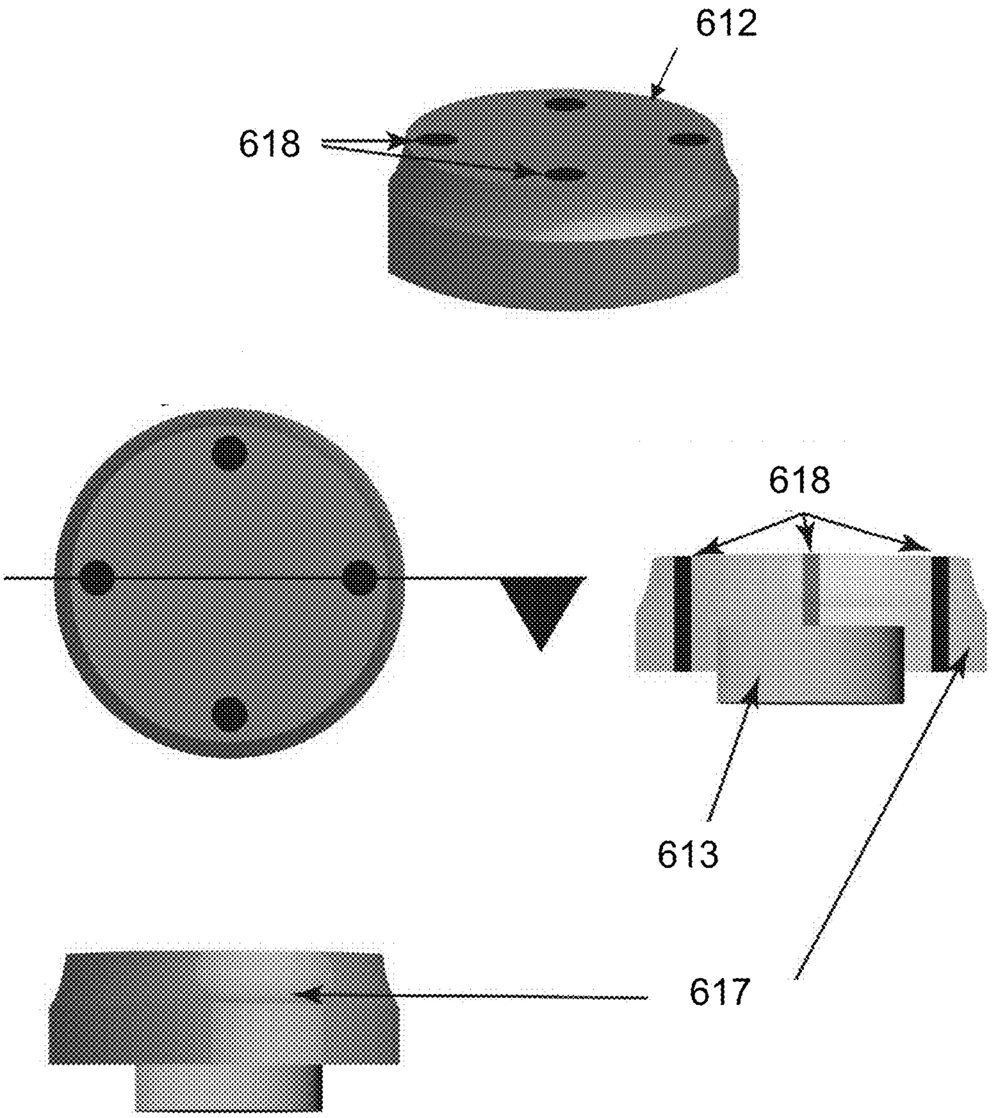
FIG. 6 shows an isometric view, top view, cross section, and side view of the head/tail mass of a magnetoelectric based resonator device with 3D printed head and tail masses with bias magnet slots and spring washers to adjust pre-stress.
Figure 7:
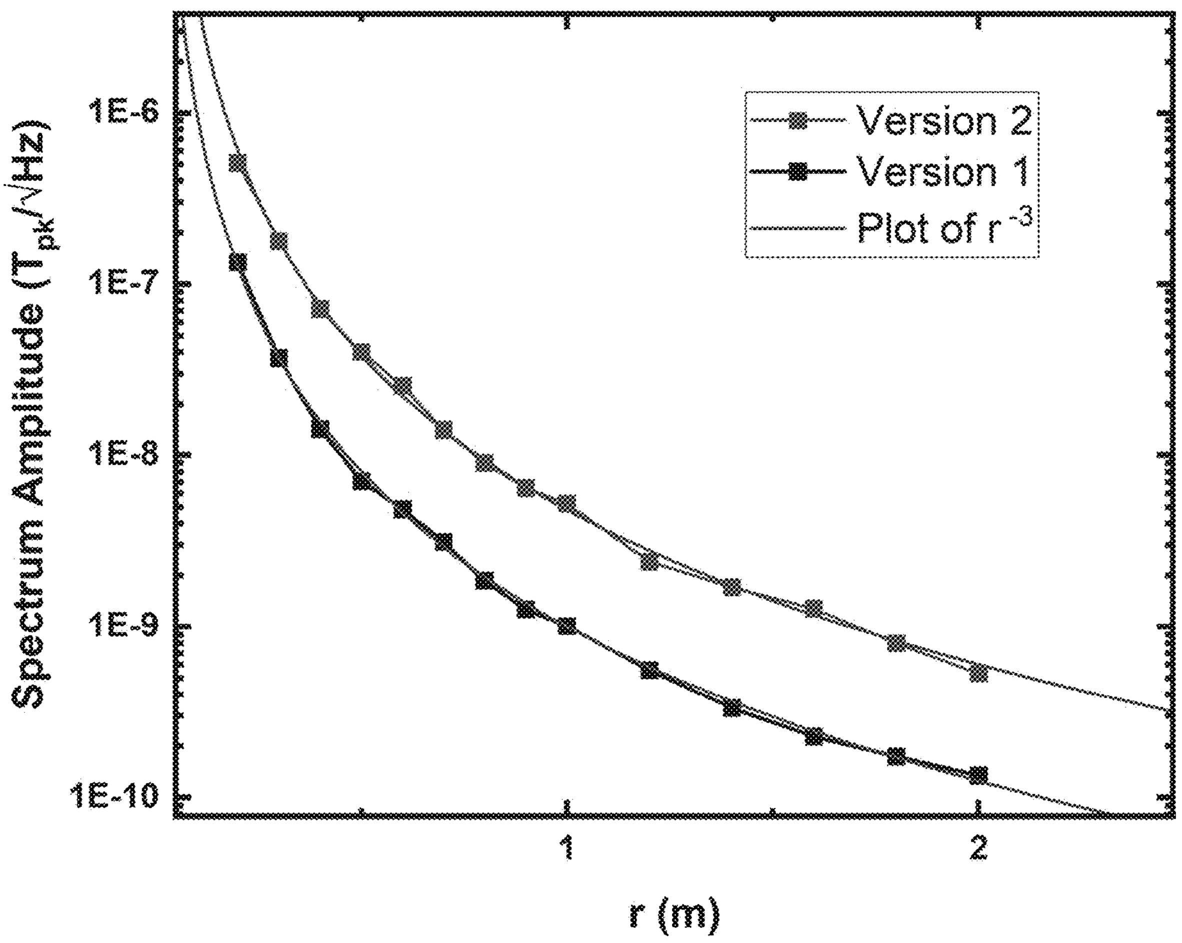
FIG. 7 shows a plot of the measured magnetic field of a device verses distance for a magnetoelastic based resonator device with a tungsten head mass and a stainless steel tail mass (version 1) and a magnetoelectric based resonator device with 3D printed head and tail masses (version 2).

In another embodiment, the metallic head and tail masses were removed and replaced with a 3D printed vinyl polymer that incorporated the bias permanent magnets (FIGS. 4A and 4B). Incorporating the neodymium ceramic bias permanent magnets as part of the head and tail masses allows for a smaller form factor and utilizing their mass in place of the tungsten and stainless-steel. By removing the metallic head and tail masses eddy currents are greatly reduced increasing the transmitted signal (FIGS. 5, 6, and 7). Also, spring washers were added to the design to promote a larger stroke of the head and tail masses. FIG. 5 shows a cross sectional view of a magnetoelectric based resonator device with a printed head mass 512 (tungsten-polymer), a printed tail mass 517 (tungsten-polymer) each with bias magnet slots. The device has two bias magnets 513 as part of the head mass 512 and the tail mass 517 and spring washers 511 to adjust pre-stress. Non-metallic nuts 510 allow for pre-stress. Non-metallic threaded rods 514 provide alignment and support of the device. The transduction column comprises a piezoelectric drivers 515 (single crystal PIN-PMN-PT) in line with a magnetoelastic transduction element 516 (laminated Galfenol rod). FIG. 6 shows head/tail mass drawings of a magnetoelectric based resonator device with printed head and tail masses. An isometric view and top view shows the head mass 612 with through holes 618. A cross section view shows through holes 618, a bias magnet 613, and the tail mass 617. A side view shows the tail mass 617. FIG. 7 shows the transmitted magnetic field at resonance for a magnetoelectric based resonator device with printed head and tail masses. The measured magnetic field of a device is plotted verses distance for a magnetoelastic based resonator device with a tungsten head mass and a stainless steel tail mass (version 1) and a magnetoelectric based resonator device with printed head and tail masses (version 2). FIG. 7 illustrates lower losses from the nonmetallic head and tail masses in version 2.

Figure 8:
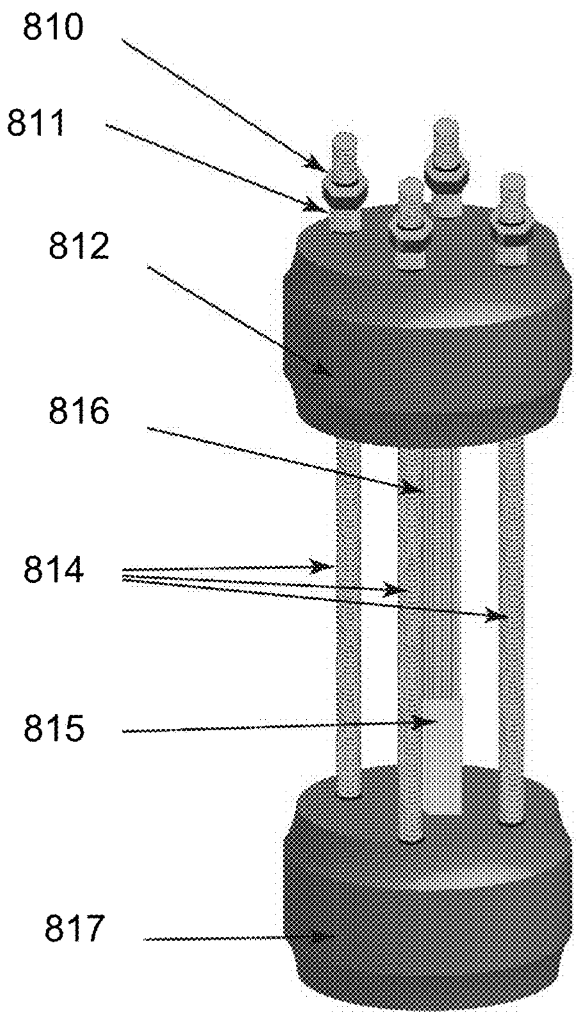
FIG. 8 is an isometric view of a magnetoelectric based resonator device with tungsten-polymer head and tail masses with imbedded bias magnets and spring washers to adjust pre-stress.
Figure 9:
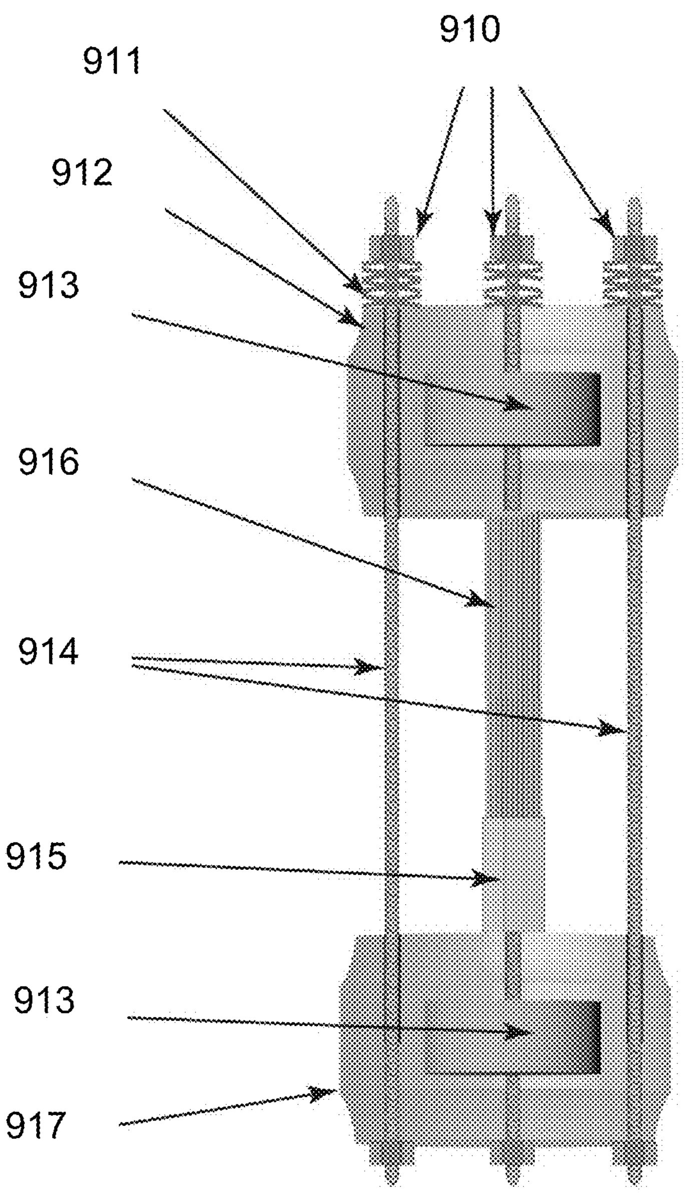
FIG. 9 is a cross-sectional view of a magnetoelectric based resonator device with tungsten-polymer head and tail masses with imbedded bias magnets and spring washers to adjust pre-stress.
Figure 10:
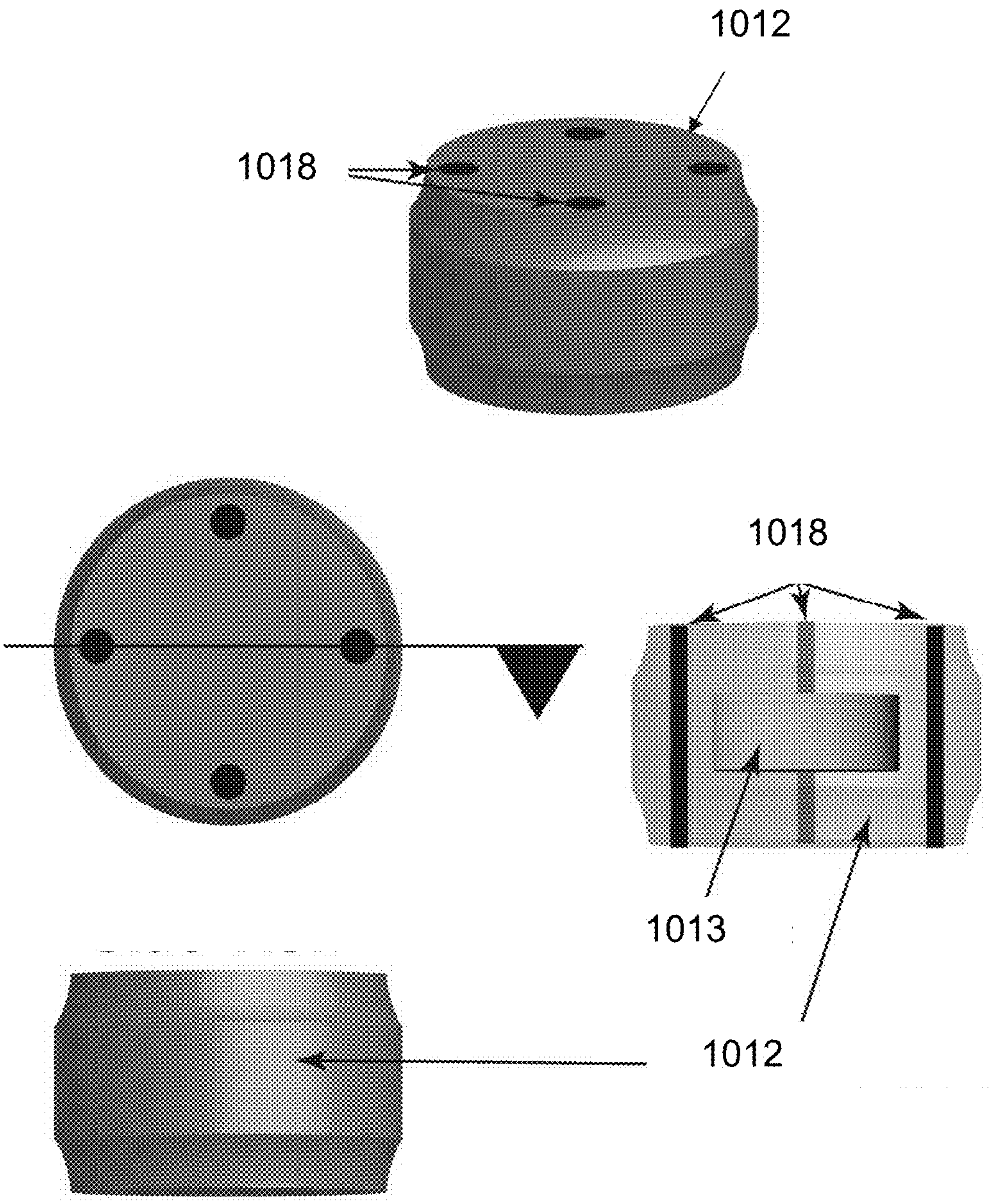
FIG. 10 shows an isometric view, top view, cross section, and side view of the head/tail mass of a magnetoelectric based resonator device with tungsten-polymer head and tail masses with imbedded bias magnets and spring washers to adjust pre-stress.

In yet another embodiment, the head and tail masses were subsequently designed to include the bias permanent magnets whereby they would be imbedded into a tungsten-polymer injection mold. Imbedding the required bias magnets into the head and tail masses benefits not only the reduction of size, but also increases the effective force between the magnets and imparts an additional avenue to optimize the needed applied pre-stress of the resonator (FIGS. 8, 9, and 10). As shown in FIG. 8, the device has a non-magnetic head mass 812 and a non-magnetic tail mass 817. It has lock nuts 810 spring washers 811 to adjust pre-stress and allow the head mass to be free to move. Non-metallic threaded rods 814 provide alignment and support of the device. The transduction column comprises a piezoelectric driver 815 (single crystal PIN-PMN-PT) in line with a magnetoelastic transduction element 816 (laminated Galfenol rod). FIG. 9 is a cross-sectional view showing the non-magnetic head mass 912, the non-magnetic tail mass 917, the imbedded bias magnets 913, the lock nuts 910, the spring washers 911, the non-metallic threaded rods 914, the piezoelectric driver 915, and the magnetoelastic transduction element 916. FIG. 10 shows head/tail mass drawings of a magnetoelectric based resonator device with tungsten-polymer head and tail masses with imbedded bias magnets and spring washers. An isometric view and top view shows the head mass 1012 with through holes 1018. A cross section view shows through holes 1018, a bias magnet 1013, and the head mass 1012. A side view shows the head mass 1012.

Figure 11:
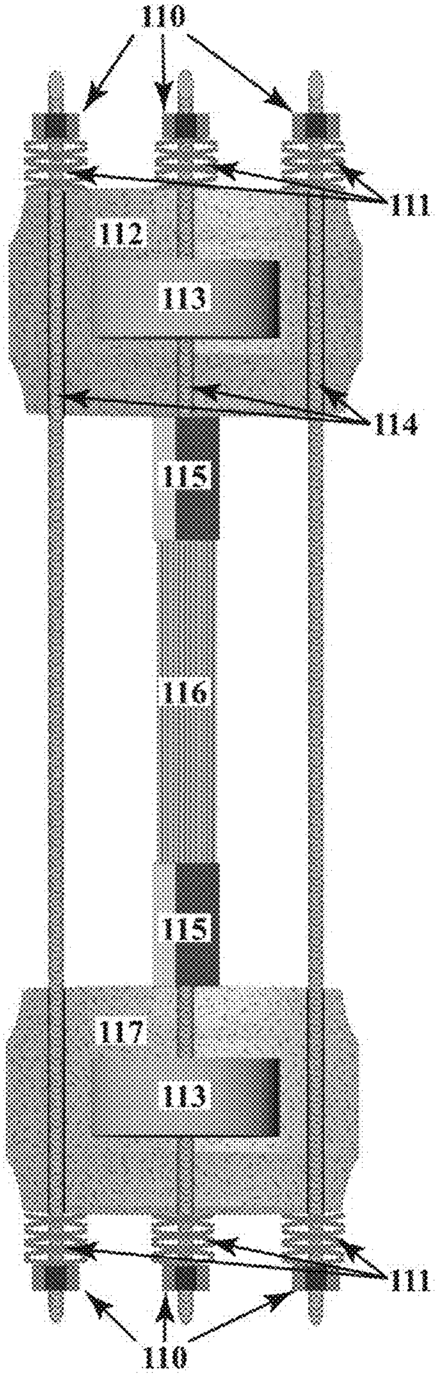
FIG. 11 is a cross-sectional view of a magnetoelectric resonator with tungsten-polymer head and tail masses, imbedded bias magnets, spring washers to adjust pre-stress, and two piezoelectric drivers.

In another embodiment, two piezoelectric single crystals are used in a symmetric fashion with one piezoelectric on each side of the magnetostrictive transduction element in order to provide a symmetric breathing mode in the resonator and a larger stroke that can be applied to the Galfenol rod (FIG. 11).

A preferred embodiment of the resonant magnetoelectric transmitter is shown in FIG. 11. It utilizes a resonant structure comprising a head mass 112 and a tail mass 117 with threaded rods 114 providing alignment and support of the device. The head mass 112 and tail mass 117 have through holes for the threaded rods 114 to pass through, and the threaded rods 114 are made of a non-conductive ceramic material. Additionally, the head mass 112 and tail mass 117 have permanent magnets 113 imbedded into the structures that provide a bias magnetic field to the laminated magnetoelastic transduction element 116. The combined head mass 112, tail mass 117, and effective mass (provided by the attractive force between the bias magnets 113) provide a bias compressive stress on the transducer elements and a specific structural resonance frequency.

At each end of the threaded rods 114, on the external side of both the head mass 112 and tail mass 117, are spring washers 111, which are utilized to allow motion of both the head mass 112 and the tail mass 117 when being driven. The spring washers 111 are abutted against the head mass 112 and the tail mass 117 and locked in place using locknuts 110 fabricated from non-metallic ceramic materials which together are capable of variably adjusting the pre-stress bias on the transduction element.

The transduction column comprises one or more piezoelectric drivers 115 (single crystal PIN-PMN-PT) in line with the magnetoelastic transduction element 116. Together, the elements drive the system into a resonant condition that is determined by the structural component physical properties.

Applying a DC voltage to the piezoelectric driver 115 will adjust the bias stress and mechanical resonance frequency. Concurrently driving the piezoelectric driver 115 using an AC voltage source, provides a uniaxial compressive stress to the laminated magnetoelastic transduction element 116. The AC voltage is tuned to the structural resonance frequency whereby the resonant magnetoelectric coupling is enhanced providing a larger transmitted signal.

The choice of piezoelectric drive elements is not restricted to $(Pb(In_{1/2}Nb_{1/2})O_3$—$Pb(Mg_{1/3}Nb_{2/3})O_3$—$PbTiO_3$ (PIN-PMN-PT). Alternatives such as, but not limited to, $Pb(Zr_xTi_{1-x})O_3$ (PZT), $Pb(Mg_{1/3}Nb_{2/3})O_3$—$PbTiO_3$ (PMN-PT) and $Pb(Zn_{1/3}Nb_{2/3})O_3$—$PbTiO_3$ (PZN-PT) can provide adequate dynamic stresses to the magnetoelastic transduction element while driving in a resonant condition. In general, the design relates to any relaxor ferroelectric with large piezoelectric coefficient. Additionally, the choice of magnetoelastic materials is not restricted specifically to $Fe_{1-x}Ga_x$ (x=0.175), or even broader $Fe_{1-x}Ga_x$ with x being any value. Alternatives include magnetoelastic materials in general that possess a stress driven dynamic permeability with non-linear magnetostrictive properties, such as Galfenol.

Figure 12A:
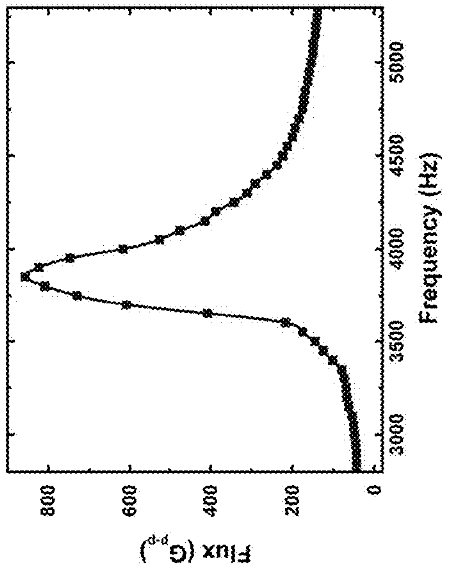
FIG. 12A shows the peak-to-peak value of dynamic flux measured across the structural resonance profile with a maximum of 867 $G_{p-p}$ on resonance while being driven at 127 $V_{RMS}$.
Figure 12B:
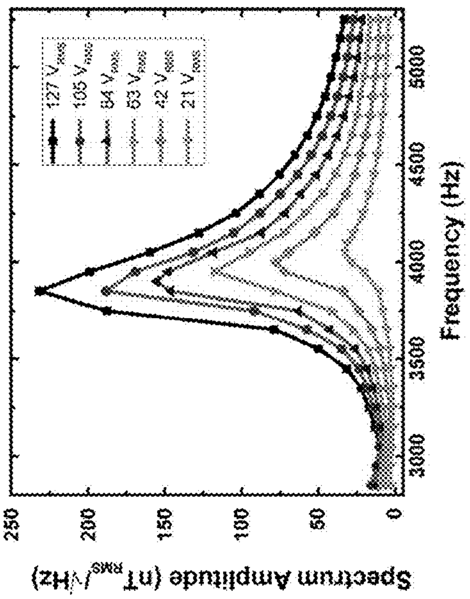
FIG. 12B shows the spectrum amplitudes for voltages from 21 $V_{RMS}$ to 127 $V_{RMS}$ are where an increased transmitted signal is measured with increasing voltages.

Resonant characteristics of the "version 1" transmitter are shown in FIG. 12, where the internal flux is plotted in FIG. 12A while being driven at 127 $V_{RMS}$ and the transmitted signal is plotted in FIG. 12B for various drive voltages. Together, these two plots represent the resonant enhancement of the signal and the correspondence between the internal flux generated and transmitted magnetic dipolar signal.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A magnetoelectric magnetic field transmitter, comprising a non-magnetic head mass with through holes;

a non-magnetic tail mass with through holes;

a bias magnet embedded in each of the non-magnetic head mass and the non-magnetic tail mass;

non-metallic rods inserted through the non-magnetic head mass and the non-magnetic tail mass via the head mass through holes and the tail mass through holes;

spring washers on the external side of the non-magnetic head mass and the non-magnetic tail mass, wherein the spring washers are around the non-metallic rods and abutted against the non-magnetic head mass and the non-magnetic tail mass;

non-metallic nuts to lock the spring washers against the non-magnetic head mass and the non-magnetic tail mass;

a single crystal piezoelectric driver on the internal side of the non-magnetic head mass and the non-magnetic tail mass, wherein the single crystal piezoelectric driver is adjacent to either the non-magnetic head mass or the non-magnetic tail mass;

a laminated transduction element on the internal side of the non-magnetic head mass and the non-magnetic tail mass, wherein the laminated transduction element is between the single crystal piezoelectric driver and either the non-magnetic head mass or the non-magnetic tail mass; and a resonant structure with a structural resonance profile, wherein the transmitter utilizes the single crystal piezoelectric as the source of mechanical excitations with the laminated transduction element to reduce eddy currents in a magnetostrictive material thereby reducing losses at higher frequencies, and the structural resonance frequency can be tuned by adjusting a size of the masses, position and strength of bias magnets, prestress conditions and physical parameters of transduction column elements.

2. The transmitter of claim 1, wherein the laminated transduction element comprises a magnetoelastic material having a stress driven dynamic permeability with non-linear magnetostrictive properties.

3. The transmitter of claim 1, wherein the laminated transduction element comprises Galfenol.

4. The transmitter of claim 1, wherein the laminated transduction element comprises $Fe_{82.5}Ga_{17.5}$.

5. The transmitter of claim 1, wherein the laminated transduction element comprises a laminate 300 micrometers thick.

6. The transmitter of claim 1, wherein the single crystal piezoelectric driver comprises an In-doped lead magnesium niobite-lead titanate.

7. The transmitter of claim 1, wherein the single crystal piezoelectric driver comprises Pb $(In_{1/2}Nb_{1/2})O_3$—$Pb(Mg_{1/3}Nb_{2/3})O_3$—$PbTiO_3$.

8. The transmitter of claim 1, wherein the single crystal piezoelectric driver comprises Pb $(Zr_xTi_{1-x})O_3$, Pb $(Mg_{1/3}Nb_{2/3})O_3$—$PbTiO_3$, or Pb $(Zn_{1/3}Nb_{2/3})O_3$—$PbTiO_3$.

9. The transmitter of claim 1, wherein the head mass and the tail mass comprise a polymer.

10. The transmitter of claim 1, wherein the non-metallic rods comprise a non-conductive ceramic material.

11. The transmitter of claim 1, additionally comprising a direct current (DC) voltage source for the piezoelectric driver to adjust bias stress and mechanical resonance frequency.

12. The transmitter of claim 1, additionally comprising an alternating current (AC) voltage source for the piezoelectric driver to provide a uniaxial compressive stress to the laminated transduction element.

13. A magnetoelectric magnetic field transmitter, comprising a non-magnetic head mass with through holes;

a non-magnetic tail mass with through holes;

a bias magnet embedded in each of the non-magnetic head mass and the non-magnetic tail mass;

non-metallic rods inserted through the non-magnetic head mass and the non-magnetic tail mass via the head mass through holes and the tail mass through holes;

spring washers on the external side of the non-magnetic head mass and the non-magnetic tail mass, wherein the spring washers are around the non-metallic rods and abutted against the non-magnetic head mass and the non-magnetic tail mass;

non-metallic nuts to lock the spring washers against the non-magnetic head mass and the non-magnetic tail mass;

two single crystal piezoelectric drivers on the internal side of the non-magnetic head mass and the non-magnetic tail mass, wherein one single crystal piezoelectric driver is adjacent to the non-magnetic head mass and the other single crystal piezoelectric driver is adjacent to the non-magnetic tail mass;

a laminated transduction element on the internal side of the non-magnetic head mass and the non-magnetic tail mass, wherein the laminated transduction element is between the two single crystal piezoelectric drivers; and a resonant structure with a structural resonance profile, wherein the transmitter utilizes the single crystal piezoelectric as the source of mechanical excitations with the laminated transduction element to reduce eddy currents in a magnetostrictive material thereby reducing losses at higher frequencies, and the structural resonance frequency can be tuned by adjusting a size of the masses, position and strength of bias magnets, prestress conditions and physical parameters of transduction column elements.

14. The transmitter of claim 13, wherein the laminated transduction element comprises a magnetoelastic material having a stress driven dynamic permeability with non-linear magnetostrictive properties.

15. The transmitter of claim 13, wherein the laminated transduction element comprises Galfenol.

16. The transmitter of claim 13, wherein the laminated transduction element comprises $Fe_{82.5}Ga_{17.5}$.

17. The transmitter of claim 13, wherein the laminated transduction element comprises a laminate 300 micrometers thick.

18. The transmitter of claim 13, wherein the single crystal piezoelectric driver comprises an In-doped lead magnesium niobite-lead titanate.

19. The transmitter of claim 13, wherein the single crystal piezoelectric driver comprises $Pb(In_{1/2}Nb_{1/2})O_3$—$Pb(Mg_{1/3}Nb_{2/3})O_3$—$PbTiO_3$.

20. The transmitter of claim 13, wherein the single crystal piezoelectric driver comprises $Pb(Zr_xTi_{1-x})O_3$, $Pb(Mg_{1/3}Nb_{2/3})O_3$—$PbTiO_3$, or $Pb(Zn_{1/3}Nb_{2/3})O_3$—$PbTiO_3$.

21. The transmitter of claim 13, wherein the head mass and the tail mass comprise a polymer.

22. The transmitter of claim 13, wherein the non-metallic rods comprise a non-conductive ceramic material.

23. The transmitter of claim 13, additionally comprising a direct current (DC) voltage source for the piezoelectric driver to adjust bias stress and mechanical resonance frequency.

24. The transmitter of claim 13, additionally comprising an alternating current (AC) voltage source for the piezoelectric driver to provide a uniaxial compressive stress to the laminated transduction element.

* * * * *